May 22, 1956 E. D. McARTHUR 2,747,086

HIGH FREQUENCY ELECTRICAL SYSTEMS HAVING HIGH INPUT IMPEDANCE

Filed June 22, 1950 2 Sheets-Sheet 1

Inventor:
Elmer D. Mc Arthur,
by Paul A. Frank
His Attorney.

HIGH FREQUENCY ELECTRICAL SYSTEMS HAVING HIGH INPUT IMPEDANCE

Filed June 22, 1950 2 Sheets-Sheet 2

Inventor:
Elmer D. McArthur,
by Paul A. Frank
His Attorney.

2,747,086
Patented May 22, 1956

2,747,086

HIGH FREQUENCY ELECTRICAL SYSTEMS HAVING HIGH INPUT IMPEDANCE

Elmer D. McArthur, Schenectady, N. Y., assignor to General Electric Company, a corporation of New York Application June 22, 1950, Serial No. 169,637

24 Claims. (Cl. 250—27)

This invention relates to high frequency electrical systems useful as transducers for the translation of high frequency electrical voltages or currents from one set of electrical characteristics to another (e. g. amplifiers, converters, mixers, frequency changers or multipliers, and the like devices for changing the amplitude, frequency or phase of electrical quantities between the input and output of the system) and which employ grid-controlled electric discharge devices as elements for controlling the energy within associated input and output circuits, such as the resonant tank circuits of an amplifier, a converter, frequency multiplier, or a like device. It is a general object of the invention to provide an improved system characterized by a number of advantages principally by a method and apparatus for controllably increasing the input impedance whereby the system may be made capable of translating at substantially higher frequencies than the systems heretofore available to the art.

This application is a continuation-in-part of my copending application Serial No. 772,517, filed September 6, 1947, now abandoned, and assigned to the assignee of the present application.

Figure 1:
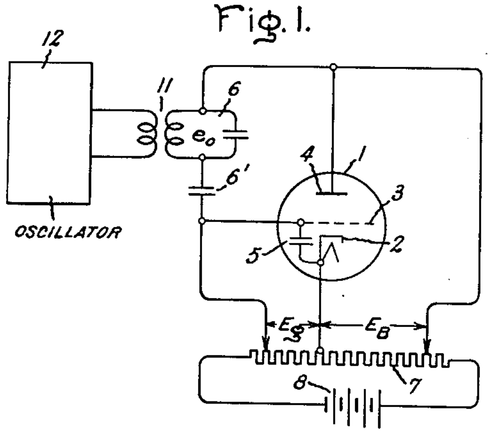
Figure 2:
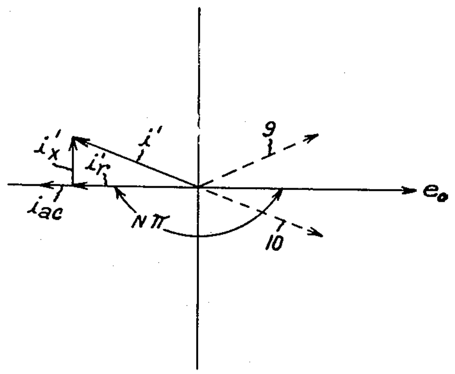
Figure 3:
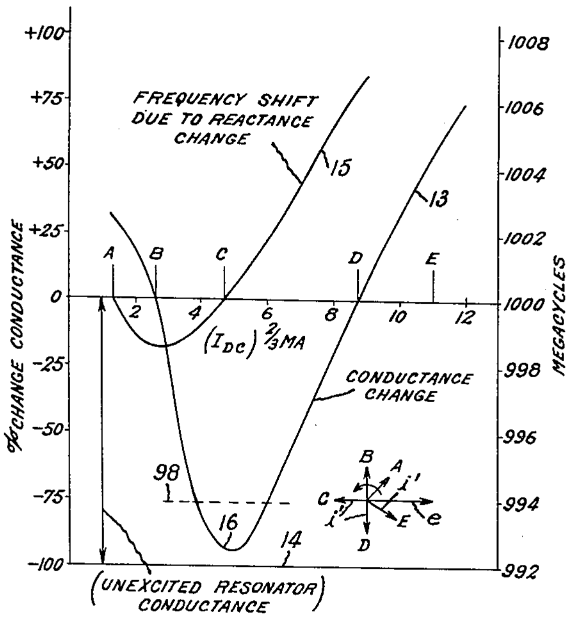
Figure 4:
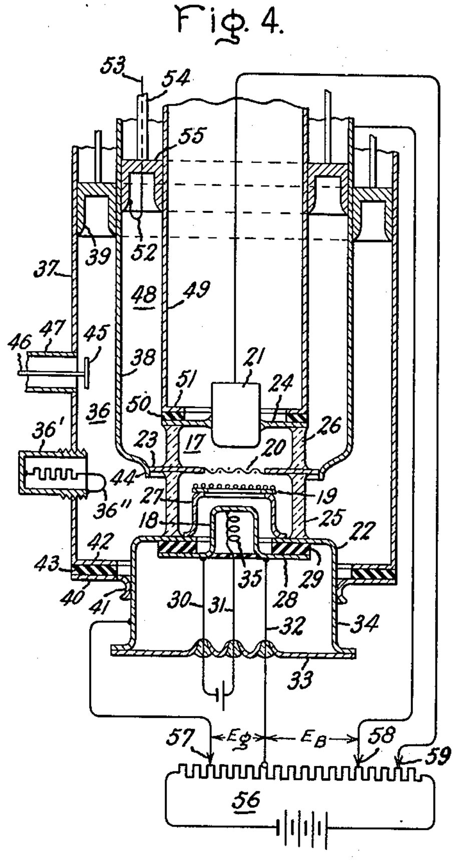
Figure 4A:
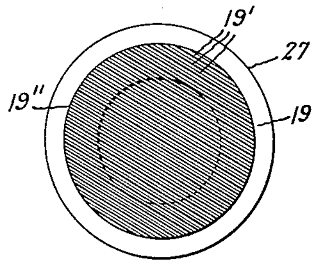
Figure 5:
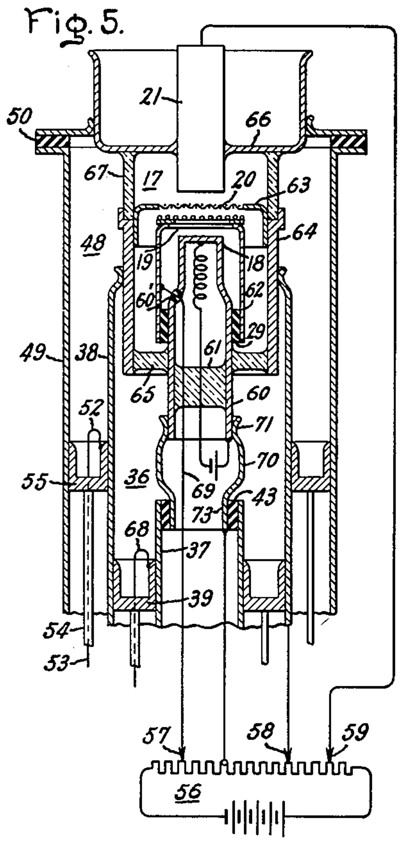
Figure 7:
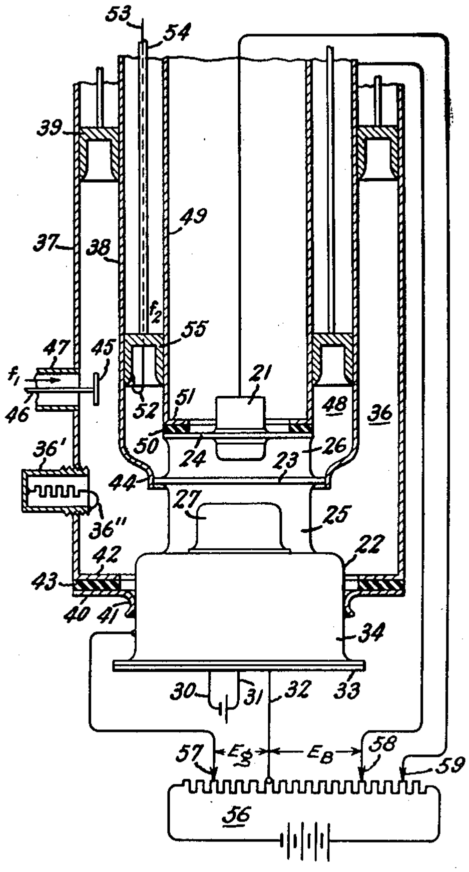
Figure 6:
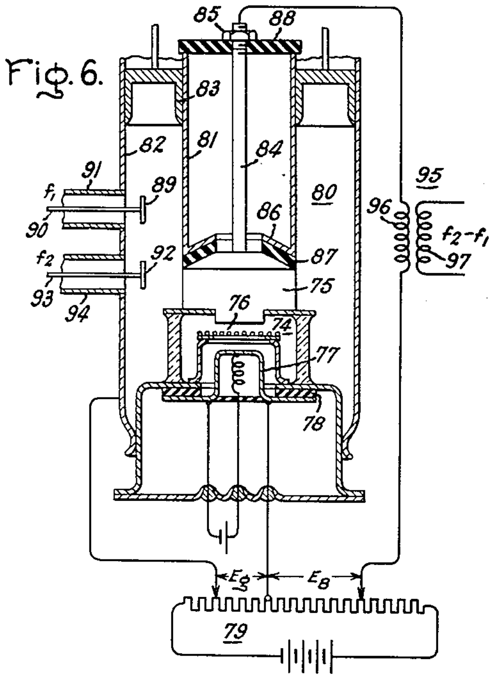

The features of the invention desired to be protected are set forth in the appended claims. The invention itself, together with further objects and advantages thereof, may best be understood by reference to the following specification when taken in connection with the accompanying drawings in which Figs. 1 through 3 are schematic diagrams employed to illustrate the fundamental principles of operation and operational characteristics of the invention; Figs. 4, 4*a* and 5 represent practical embodiments of the invention in high frequency amplifiers for amplifying voltages or currents; Fig. 6 represents one practical embodiment of the invention in a converter or mixer circuit; while Fig. 7 illustrates similarly a frequency multiplier circuit.

As is well known, one of the factors limiting the development of the ultra high frequency electrical arts at the increasingly higher frequencies toward which the art is currently in trend has been the problem of devising transducer or translation apparatus such as amplifiers, mixers, converters, frequency multipliers, and the like capable of functioning at the highest possible frequencies. The practical usefulness of prior art apparatus in meeting this problem has been limited by progressive lowering of the input impedance at the higher frequencies attributable primarily to the effect of capacitance between the electrodes and electrode leads of the discharge device employed and to shifts of phase of the electron current attributable to electron transit time phenomena. As a result, in conventional discharge devices, the electronic reaction at the input electrodes is such as to extract energy from the input voltage and so heavily load the source of input voltage that the input signal is attenuated to the point where high power or voltage gain becomes very difficult to attain. Numerous expedients have been devised to increase the input impedance in order to overcome the shortcoming and thereby to permit satisfactory functioning of the device at the higher frequencies, but none of these have been found to afford a satisfactory increase of input impedance in the ultra high frequency ranges for which the art is currently finding use. By contrast, the present invention provides a very satisfactory high input impedance system within these frequency ranges.

Briefly stated, the objects of the invention are accomplished by developing in the input circuit a controlled amount of negative resistance which has the effect of neutralizing any desired amount of the inherent or artificially supplied positive resistance of the input circuit. Thereby the effective input impedance may be raised substantially, the energy dissipated in the input circuit decreased, and the gain of the system improved. In a broad sense, the result is obtained by controlled adjustment of the electron transit angle in the grid-cathode region of the grid-controlled discharge device in a manner similar to that disclosed in my copending application Serial No. 751,358, filed May 29, 1947, now abandoned in favor of copending continuation-in-part application Serial No. 179,854, filed August 16, 1950 and entitled Electric Discharge Devices and High Frequency Systems Therefor, which application is assigned to the same assignee as the present invention. By this means, the input circuit impedance can be made much higher than in similar conventional devices and, in fact, it can be made much higher than the input impedance which would characterize the input circuit in an unexcited state, i. e. when it is not being excited by the electron current of the tube which causes the system to function.

The amount of negative resistance developed in this manner may be readily controlled to the point of leaving a small residual amount of inherent positive resistance, thus avoiding a net negative resistance in the system such as would cause self-oscillation thereof. Alternatively, the condition of net negative resistance and thereby self-oscillation may be precluded by artificially adding to the amount of positive resistance in the input circuit in order to insure that the balance between positive and negative resisance is always at least slightly on the positive side. If, as in one illustrated case hereinafter outlined, self-oscillation be desirable, that may be readily provided by permitting a net negative resistance to obtain. Control to all of these ends of the relative amounts of positive and negative resistance may be effected by controlling the amount of current flow, by using an electron current phase lag (electron transit angle) of suitable value in the electron stream or by artificially loading the resonant circuit of the input circuit to stabilize the same. The manner of creating all of these conditions will be discussed more in detail hereinafter.

In my aforesaid continuation-in-part application, I have described conditions under which a grid-controlled, space charge controlled discharge tube can be caused to sustain oscillations in a single resonant circuit, such as a cavity resonator, by control of electron transit angle phenomena within the discharge tube. Those conditions are such as to give rise to a sufficient negative resistance within the circuit to permit self-oscillation thereof and may be briefly outlined as follows with reference to Fig. 1 showing schematically an oscillator of the type described in the aforesaid application. That oscillator may comprise, for example, a grid-controlled, space charge controlled discharge tube 1 having a cathode 2, a control grid 3, an anode 4 and a connection, such as a capacitor 5, having infinite impedance to unidirectional voltage currents and yet zero or substantially zero impedance to alternating high frequency voltages and currents within the normal range of high frequencies at which the circuit normally is intended to function. Between the anode 4 as one terminal and the grid and cathode comprising together a high frequency unit as another terminal, there may be connected a resonant circuit 6, which may, for example, comprise a cavity resonator, and an isolating capacitor 6'. The circuit may be energized by unidirectional voltages $E_B$ and $E_g$ applied respectively to the anode 4, the grid 3 by any suitable means such as the voltage divider 7 energized by the battery 8, for example.

As shown in the aforesaid continuation-in-part application, the circuit of Fig. 1 may be caused to have sufficient negative resistance to oscillate with a high frequency load voltage $e_0$ across circuit 6 if the various circuit parameters be at least approximately related by the following expression:

$$\sqrt{\frac{E_B}{u}+E_g}=3020\frac{S_g}{N\lambda} \qquad (1)$$

where $S_g$ is the grid-cathode spacing in centimeters
N is any odd integer
$u$ is the amplification factor of the tube 1
$\lambda$ is the wavelength in centimeters.

As likewise shown in the aforementioned continuation-in-part application, the alternating current phase angle due to transit time phenomena, that is, the approximate phase angle by which the fundamental frequency component of electron current in the tube 1 lags behind the fundamental component of the sinusoidal voltage $e_0$, will obey the following approximate expression at the voltages of Equation 1—at least during the period when oscillations are beginning:

$$\phi=N\pi \qquad (2)$$

where N is an odd integer.

In Fig. 2, there is shown a vector diagram indicating the phase relations between the currents and voltages involved in the circuit of Fig. 1. The vector $i_{ac}$ representing the fundamental component of load current is shown as lagging behind the load voltage vector $e_0$ by the phase angle $N\pi$ for the voltages given by the Equation 1. If some other value of the energizing voltages be used, the phase angle (electron transit angle) can be made somewhat different and the current may be represented by some illustrative vector $i'$ having an angular position controllable in a manner to be described. Self-sustained oscillations will be maintained so long as vector $i'$ is sufficiently far left of the vertical coordinate line to have a negative resistive current component $i'_r$ large enough to give rise to an amount of negative resistance (equivalent parallel negative resistance) less than any positive parallel resistance in the system. If the amount of negative parallel resistance attributable to $i'_r$ is greater than the positive parallel resistance of the system, the voltage $e_0$ can be sustained only by supplying energy from an external exciting source.

The resistive component $i'_r$ may be utilized to control or adjust the net effective resistance of the circuit and thereby the effective impedance. If it be adjusted to neutralize all but a slight amount of the positive resistance so that the net resistance of the system is just slightly positive, a non-oscillating circuit of low energy loss and consequent high effective impedance will result. Alternatively, if it be adjusted to more than neutralize the positive resistance so that the net is negative, self-oscillation will obtain as is well understood by those skilled in the art. The reactive current component $i'_x$ will affect the resonant frequency to some extent but that effect may be minimized in such manner as to obviate undue and undesired interference with the operation of the circuit for the purposes of the present invention. Alternatively, it may be utilized to adjust the effective reactance of the system for tuning or reactance tube effects in the manner shown and claimed in my copending application Serial No. 775,607, filed September 23, 1947, and now abandoned.

To adjust the effective resistance or reactance for these purposes, the vector $i'$ may be caused to rotate throughout a wide range of angular positions by adjustment of the quantity $$\left(\frac{E_B}{u}+E_g\right)$$

If these voltages be fairly low, the vector $i'$ may take some such illustrative position as that indicated by the dotted line 9. As the voltage is raised that vector $i'$ will rotate continuously in a counter-clockwise direction from the position of line 9 until it approaches the vector $e_0$ from the lower side as indicated by dotted line 10 representing a position when the voltages are high. So long as the vector $i'$ is on the left-hand side of the vertical coordinate line, its resistive component will, of course, have the effect of introducing negative resistance which may be utilized for producing oscillation or a high impedance system depending on whether the net effective resistance is negative or positive respectively. So long as it is on the right-hand side of the vertical coordinate line, its resistive component will have the effect of introducing only positive resistance. Similarly when vector $i'$ is above the horizontal coordinate line, its reactive component will be effectively capacitive when it is below the horizontal coordinate line, effectively inductive. A proportionate shift in the effective resonant frequency of circuit 6 to a lower or higher value respectively will result.

From the foregoing, it is apparent that a readily controllable amount of negative resistance may be introduced into the circuit 6 by properly controlling the phase angle $\phi$ due to electron transit time effects by varying the average energizing voltages. The amount of positive resistance in the circuit can, of course, be varied by varying the Q of the circuit 6 by any of the suitable means known to those skilled in the art. Thus, it will be possible to obtain any desired balance between the negative and the positive resistance in the circuit and thereby to reduce the net to a low positive value just sufficient to preclude self-oscillation of the circuit and to cause it to have a very high input impedance suitable for the purpose of an amplifier, converter, frequency multiplier or the like.

The properties of the foregoing system as the electron transit angle varies throughout the plurality of values between lines 9 and 10 of Fig. 2 are indicated by the curves of Fig. 3, which are representative of curves I have been able to reproduce in practice. These curves may be obtained by measuring the Q and the effective resistance (or its reciprocal, conductance) of the circuit 6 as the quantity $$\left(\frac{E_B}{u}+E_g\right)$$

is raised from a very low value and the resonant circuit 6 is energized by a suitable external source indicated generally by the coil 11 supplying high frequency energy from any suitable source indicated by the block 12 at a frequency within the normally expected operating range of the system. By resistance or conductance as here used is meant the equivalent shunt resistance or conductance, i. e. the resistance or conductance of a resonant circuit electrically equivalent to circuit 6 and comprising an inductance, capacitance, and a resistance connected in parallel. For convenience, the abscissae are designated in terms of the two thirds power of the average unidirectional current ($I_{DC}^{2/3}$) since that is a direct measure of the quantity $$\left(\frac{E_B}{u}+E_g\right)$$

in accordance with the following equation:

$$I_{DC}^{2/3}=K\left(\frac{E_B}{u}+E_g\right) \qquad (3)$$

where K is a proportionality constant. In turn the quantity $$\left(\frac{E_B}{u}+E_g\right)$$

is a measure of the electron transit phase angle $\phi$ since it can be shown that:

$$\theta=9500\frac{S_g}{\lambda\sqrt{\frac{E_B}{u}+E_g}} \qquad (4)$$

It follows therefore that $I_{DC}^{2/3}$ is a measure of the phase angle of vector i'. The external excitation from the source 12 and the coil 11 is provided since the circuit will not sustain oscillations of itself under the net positive resistance conditions involved in the present invention.

The curve 13 designated "Conductance change" in Fig. 3 represents conductance contributed by the resistive component of $i'$ to the total conductance of an input cavity resonator in a system of the type shown in Fig. 4 (hereinafter to be described) as the tube current $I_{DC}$ is caused to increase by progressive increase in positive direction of $E_B$ and $E_g$. The conductance of the cavity resonator in an unexcited condition, that is, when the system is completely unenergized by any voltages, is indicated by the abscissa 14. The conductance of the unenergized cavity resonator will, of course, be positive in sign and hence the value represented by line 14 should be considered only as indicative of the percentage magnitude. The curve 13 is plotted as a percentage of the unexcited conductance. A curve of a corresponding variation in resonant frequency shift of such a resonator is represented by the curve 15 designated "Frequency shift due to reactance change." Representative frequency changes for resonators of the type of Fig. 4 are indicated by the ordinates of the right-hand margin.

As will be readily apparent from the curve 13, the resistance increment or decrement introduced into the circuit will begin as a positive value at an abscissa A indicating that the vector $i'$ has a phase angle in the first quadrant (near line 9) of Fig. 2. This is indicated by the small vector diagram in the lower right-hand corner of Fig. 3. As the voltage is raised and the current therewith, it will be noted that the positive resistance decreases indicating that the vector $i'$ is rotating in a counterclockwise direction and when it reaches a point in which it is in quadrature with the exciting voltage $e_0$ it will become zero, as indicated at the abscissa B and in the small vector diagram. As the quantity $$\left(\frac{E_B}{u}+E_g\right)$$

is raised further, the current will, of course, increase and the resistance introduced begins to take on negative values. Continued increase in the voltage and current exciting the circuit will ultimately bring the vector $i'$ to a point corresponding to abscissa C whereupon it is in phase opposition to the exciting voltage $e_0$, as indicated by the small vector diagram at C. At this point the maximum amount of negative resistance has been introduced by the phenomena outlined above. Further increases in voltage from there on will tend to decrease the negative resistance and rotate the vector $i'$ further counterclockwise until finally the resistance change has again reached zero at the abscissa D as likewise indicated by curve 13 and the small vector diagram. Further increases in the current and voltage will cause the resistance to assume increasingly positive values following the end of the curve 13 which will approach a horizontal asymptotic value as increasing voltage brings the vector $i'$ closer and closer to vector $e_0$ as a limit. In practice the limit of rotation of vector $i'$ will be that fixed by the maximum allowable current, voltage and heat dissipation and is represented by some abscissa E, as indicated by the small vector diagram.

It is assumed in the foregoing discussion of the curves of Fig. 3 that the equivalent parallel conductance of the resonant circuit 6 is such as to leave a net positive conductance at all times in order to prevent oscillations. Thus, its equivalent shunt conductance indicated by the abscissa 14 has a value somewhat below the point 16 of maximum amount of the negative conductance change introduced by the above phenomena. It will be apparent from this that at the low point 16 of the curve 13, the net conductance of the circuit will be that indicated by the differential ordinate between abscissa 14 and point 16, which means that the net shunt or parallel resistance is extremely high and therefore the effective impedance of the cavity of the resonant circuit 6 will be extremely high. I have found in practice that it is possible, for example, to take a resonant cavity having a Q of about 1,000 when unexcited and by means of the foregoing principles to raise its effective Q to about 12,000, which is its value at the point 16, the lowest point of the curve.

The frequency shift in the resonant frequency of circuit 6 due to the reactance effect of the reactive component of vector $i'$ behaves correspondingly. As indicated generally by the curve 15, it begins at a capacitative value near abscissa A, goes through a minimum at or near abscissa B, takes on a zero value at the abscissa C and then proceeds to inductive values until it approaches a horizontal asymptotic value as the vector $i'$ approaches the load voltage vector $e_0$ in the counterclockwise direction. As already indicated, this phenomenon may be utilized for purposes of constructing reactance tubes and reactance devices in the manner shown and described in my mentioned copending application Serial No. 775,607, now abandoned.

It should be understood that the curves of Fig. 3 represent the phenomena involved for but one cycle of rotation of the vector $i'$ about the point of origin (specifically, for the cycle in which the value of $N=1$ of Equation 2 occurs). A plurality of similar cycles, each corresponding to one of the higher odd values of N (higher modes), may be made to occur in the lower voltage range below the abscissa A. These would form continuous cyclic extensions of decreasing amplitude of the left-hand ends of curves 13 and 15 and might be thought of as the conditions prevailing if the vector $i'$ were rotated through a plurality of cycles clockwise from the position of line 9 as the voltages are decreased. The amplitude obviously decreases during those cycles toward the vertical coordinate line because the voltage and currents decrease. With proper circuit conditions these higher order cycles may also be used for the purpose of the invention. They may, of course, be better illustrated by enlargement or elongation of the horizontal coordinate axis within the region to the left of abscissa A.

Turning now to Fig. 4, I have shown one practical embodiment of the foregoing principles of my invention in an amplifier suitable for use at ultra high frequencies. The system there shown may be built around a discharge tube 17 comprising generally a cathode 18, a grid 19, and accelerator electrode 20 (corresponding respectively to cathode 2, grid 3 and anode 4 of Fig. 1) and an anode 21. These electrodes are supported in the following manner. The three generally parallel metallic plates 22, 23 and 24 are positioned in insulated spaced relation by the walls 25 and 26 of glass, ceramic or like material between which the plate 23 is interpositioned. Across the central annular opening of the plate 23 the electrode 20 is welded or otherwise secured to the plate and as indicated it may comprise an open mesh-type structure in order that the current of the tube may pass therethrough to the anode 21. The grid 19, which may be of parallel wire form for a purpose to be described hereinafter, is supported similarly by the cylindrical member 27 which is conductively affixed to the plate 22. The cathode 18 is supported by an annular flange 28 on its cylindrical body portion and separated from the plate 22 by the dielectric spacer 29 to which it is affixed in a manner corresponding to that of Fig. 6 of my aforementioned continuation-in-part application Serial No. 179,854. It will be understood that the juxtaposed portions of the flange 28 and the plate 22 will, with the spacer 29, constitute a capacitor having a high frequency impedance as near to zero as possible so that the electron transit angle may be controlled by adjustment of the interelectrode direct current potentials and so that high frequency signals applied to the tube input will not appreciably affect the electron transit angle. The anode 21 is supported through a circular opening in the plate 24. It will be understood that the entire structure is hermetically sealed in the usual manner and leads 30, 31 and 32 may be provided extending through the base plate 33 affixed to cylindrical extension 34 of plate 22. The leads 30, 31 and 32 serve as lead-in connections to the cathode heater coil 35 and the cathode 18 as indicated.

As a suitable resonant input circuit corresponding to the circuit 6 of Fig. 1 there may be provided a cavity resonator 36 formed by the concentric cylinders 37 and 38 which are short-circuited at their outer ends by a slidable tuning member 39 which tunes the cavity in the well-known manner. The cylinder 37 is connected to the plate 22 for high frequency currents through the collar 40 having spring fingers 41 which engage the extension 34 of the plate 22 and through the blocking condenser constituted by the collar 40, the flange 42 on the end of the cylinder 37 and the interposed dielectric member 43 of insulating dielectric material. It will be understood that this member of dielectric material will form a high resistance path comparable to isolating capacitor 6′ of Fig. 1 blocking the flow of unidirectional current between the anode 20 and the grid 19, and yet will form a substantially zero impedance path to the flow of ultra high frequency currents. The inner cylinder 38 is connected to the grid by suitable spring fingers 44 formed on an inward extension of the cylinder. For the purpose of introducing an input signal to be amplified any suitable means may be employed, for example, the input probe 45 which is connected through the concentric line comprising the inner and outer conductors 46 and 47 respectively which are connected to any suitable source (not shown) of signal voltage to be amplified.

As an output circuit for deriving amplified voltages corresponding to the voltage input, there may be provided a similar cavity resonator 48 comprising the concentric cylinders 38 and 49 connected between the electrode 20 and anode 21. The cylinder 49 is connected to the anode 21 for high frequency currents through a substantially zero impedance capacitor comprising the dielectric member 50 and the juxtaposed metallic walls of the plate 24 and the flanged extension 51 of the cylinder 49. This capacitor serves to prevent short circuiting of the anode 21 and electrode 20 by the resonator 48 for unidirectional currents. Any suitable means for deriving output energy from the cavity 48 may be provided, for example, the inductive loop 52 which is positioned within the cavity and connected to any suitable external utilization circuit (not shown) through the concentric line comprising the inner and outer concentric members 53 and 54 respectively. The cavity is, of course, tuned by means of the sliding plunger 55 in a manner similar to that of the cavity 36.

Any suitable means for energizing the circuit may be provided and such is illustrated schematically by the potential divider 56 which, through the connections shown, may supply a negative voltage to the grid 19 through the contact 57, a relatively positive voltage to the electrode 20 through contact 58 and the same or a more positive voltage to the anode 21 through contact 59.

It will be understood in view of the principles heretofore set forth that the impedance of the input cavity 36 may be made extremely high by proper adjustment of the potentials $E_B$ and $E_g$ in accordance with the equations already set forth. Therefore, any given amount of input signal energy will produce a much larger input voltage than in prior art devices; high frequency input signals introduced by the probe 45 will therefore be less subject to the aforementioned limitations of amplifiers of the prior art. This is, of course, because of the high impedance of the cavities. That impedance may be chosen to take any value indicated by the curves of Fig. 3. Preferably, the values of $E_B$ and $E_g$ are so chosen that the system operates at the minimum point 16 of the curve of Fig. 3 at which point the impedance of the cavity is higher, provided, of course, that it is resonant at the frequency being amplified.

The hereinbefore mentioned parallel wire form in which grid 19 may be constructed is more fully shown in the plan view of Fig. 4*a*. This form comprises a series of spaced parallel wires 19′ of a conductive material, such as tungsten, affixed to an apertured disk 19″ by any convenient means, such as gold solder. Wires 19′ are spaced sufficiently to permit the ready passage of electrons therethrough but closely enough to facilitate the establishment of what may be termed a "magnetic feedback," as will be more fully described hereinafter. It has been observed that, with devices of the invention having the same direct current electrical characteristics, a gain of from 2 to 4 in power output can be obtained by employing the parallel wire form of grid construction, rather than the well-known mesh type. In other words, the direct current plate voltage, plate current, amplification factor and transconductance may be identical but a substantial increase of high frequency power output is realized by employing the above-described parallel wire grid.

The theory of this "magnetic feedback" phenomenon resulting from the utilization of a parallel wire grid structure as above described is not fully understood. However, the only explanation which seems to be justified by experimental data is as follows.

In devices of the invention having a parallel wire grid structure as illustrated in Figs. 4 and 4*a*, most of the high frequency displacement current flowing through the capacitance between electrode 20 and grid 19 must flow along grid wires 19′ from the apertured disk 19″. This system of parallel currents gives rise to magnetic field lines (hence the term "magnetic feedback") surrounding the grid wires in closed loops. Consequently, a magnetic field may be regarded as forming a sheath around the grid wires in a direction perpendicular to the wires; the magnetic field lines pass over the grid wires in the grid-anode interspace and form closed loops by returning along a path in the grid-cathode interspace.

At the very high frequencies at which the devices of the invention are designed to operate, the Maxwell field equations stipulate that such a magnetic field will give rise to a corresponding electric field which is perpendicular to the magnetic field. The component of this electric field appearing in the grid-cathode interspace will accelerate the electrons and produce a cyclic variation of the current just as would an electric field from any other source. This electric field resulting from magnetic feedback may be conveniently called a secondary alternating electric field.

It is believed that the secondary electric field and the field which penetrates the grid structure from the grid and electrode 20 interspace, as more fully described in my copending continuation-in-part application Serial No. 179,854, are always additive to give an enhanced electric field within the grid-cathode interspace. The secondary field increases with frequency and becomes quite important at frequencies above 200 to 300 megacycles. The secondary field may be considered as creating an increase in transconductance with a constant amplification factor or as creating a decrease in amplification factor with a constant transconductance.

If it be desired to add to or vary the positive resistance of the resonator 36 any suitable artificial loading means may be employed. As one example, there is shown a resistive concentric line 36' coupled to the resonator and arranged either to be rotated or moved in and out of resonator 36 in order that its coupling loop 36'' may couple with more or less of the flux of the resonator and this introduces more or less resistance thereinto.

In Fig. 5 there is shown an alternative embodiment of the system of Fig. 4 and, in view of the similarity of construction, like numerals have been used to designate like parts wherever possible. It will be noted that the structure of the discharge tube 17 is somewhat modified in a manner which permits more convenient insertion of the tube into the structure with which it is to operate as an amplifier. In this case, the cathode 18 is constructed by means of the tubular member 60 which is closed at one end by the glass seal 61. The grid 19 is supported by the cylinder 62 surrounding and supported by member 60 and yet separated therefrom by the zero impedance capacitor formed by the dielectric spacer member 29, as in the case of Fig. 4. The electrode 20 is supported by the cylinder 63 conductively connected to the metallic wall 64 which is positioned in spaced relation to the cathode tube 60 through the dielectric seal 65. The anode 21 is supported on the metallic base 66, which is in turn supported from the metallic wall 64 by means of the glass or ceramic cylinder 67. The input and output resonators 36 and 48 are, as before, formed by concentric lines 37, 38 and 49 and each is short-circuited for the purpose of tuning by means of the slidable plungers 39 and 55. The input resonator is provided with an input loop 68 for introducing signals to be amplified while the output cavity is provided with a similar loop 52 for deriving an output and passing it on to a suitable utilization circuit (not shown). The average potential of the grid may be fixed in this case by means of the lead 69 which extends through the glass seal 61 and through a sealed insulated opening 60' in the cathode member 60 into contact with the grid supporting cylinder 62. The cathode cylinder 60 may be connected to the inner cylinder 37 through the medium of an adapter connection 70 having the spring fingers 71 engaging the cathode cylinder and having at its other end a restricted portion 73 which forms with the end of the cylinder 37 and the dielectric member 43 a blocking condenser as before.

The foregoing principles may also be used to construct a high impedance converter or mixer circuit for the purpose of converting high frequency signal voltages from one frequency to another by the well-known heterodyne method. In such a circuit or system an input signal of frequency $f_1$ may be introduced into a high impedance cavity resonator of the aforementioned type along with a local frequency signal $f_2$. By the method already described for the amplifiers of Figs. 4 and 5, the phase of the current in the tube associated with the cavity resonator may be so chosen that the input impedance is very high. The result is that a relatively weak signal of frequency $f_1$ in conjunction with the local frequency $f_2$ can create an electric field at the input gap such that a substantial current component of differential frequency $(f_2-f_1)$ will flow in a beat frequency output circuit. Where desired, the local frequency $f_2$ may be supplied by the cavity itself by causing it to oscillate in the manner described in my aforementioned continuation-in-part application Serial No. 179,854.

A practical embodiment of a converter or mixer circuit of the mentioned type is illustrated in Fig. 6. It will be observed that the system comprises a cavity resonator and associated discharge tube generally the same as that of the oscillator of my last-mentioned application. That is to say, it comprises the discharge tube 74 having the anode 75, the grid 76, the cathode 77 and the zero impedance capacitance connections through dielectric spacer 78 between the cathode and the grid. Each of these electrodes is energized by the voltage divider circuit 79 as indicated. A single cavity resonator 80 is connected between the anode 75 and the grid-cathode as a high frequency unit and takes the form of the concentric cylinders 81 and 82 having a slidable tuning short 83 for purposes of setting the natural resonant frequency of the resonator at approximately the frequencies of the voltages to be mixed in heterodyne fashion. The inner cylinder 81 is secured to the anode 75 by the rod 84 and nut 85 and yet insulated therefrom by the blocking capacitor comprising the adjacent edges of the anode 75 and the flange 86 of the cylinder 81 with the spacer 87 of dielectric material in between. The insulating member 88 prevents a short circuiting of the cylinder 81 to the anode.

Any suitable means for introducing the source of signal frequency $f_1$ may be employed, such as the probe 89 connected to the concentric line comprising the inner and outer concentric members 90 and 91 which may be connected to the source (not shown) of signals to be heterodyned with the local frequency $f_2$. The frequency $f_2$ is introduced in a similar manner by means of a probe 92 connected to the concentric line comprising the inner and outer conductors 93 and 94 which are connected to any suitable source of local oscillation (not shown). It will be understood by those skilled in the art that the mixing of the two frequencies $f_1$ and $f_2$ in the resonator will result in a signal component of a differential frequency $f_2-f_1$ and that that differential frequency or intermediate frequency may be derived from the anode circuit through any suitable means illustrated, for example, by the intermediate transformer 95 having a primary 96 in the anode circuit and a secondary 97 connected to any suitable utilization circuit (not shown).

In this case, it will be understood that the voltages $E_B$ and $E_g$ applied to the anode and the grid will be proportioned as before in order to provide a high impedance in the cavity. If desirable, the probe 92 and its associated transmission line may be omitted and the cavity caused to oscillate to supply the local frequency component of itself. In that case, it will suffice that the Q of the cavity and the voltages $E_g$ and $E_B$ be chosen such as to give the cavity a slightly negative resistance in order to make it oscillate at the desired frequency $f_2$. That is to say, the voltages will be proportioned such as to make the resonator conductance follow some such characteristic curve as that indicated by 13 in Fig. 3, but the Q of the resonator will be adjusted to give an unexcited impedance or conductance represented by some line 98 of Fig. 3 above the point 16. The system will then have a net negative resistance for the portion of the curve 13 below the line 98, and for voltages corresponding to that portion the resonator will oscillate.

It will be apparent that the principles of this invention may also be used in circuits employed for changing or multiplying frequencies, that is, for translating a voltage of given frequency into a voltage harmonically related thereto (i. e. a harmonic or subharmonic thereof). As an example of such an arrangement, there is shown in Fig. 7 a circuit substantially the same as that of Fig. 4, for which reason like numerals have been employed to designate like parts throughout. In this arrangement the input cavity resonator 36 may be tuned to a given input frequency $f_1$ and the output cavity 48 tuned to any of its harmonic frequencies $2f_1$, $3f_1$, $4f_1$, etc., or to an appropriate subharmonic thereof. This effect may be accomplished simply by tuning the output cavity 48 by means of the plunger 55, which, for the harmonics, will be positioned at a point further downward along the axis of the cavity, as shown, in order to reduce its inductive and capacitative characteristics to the point where it is resonant at such a harmonic. In that case, an input voltage of frequency $f_1$ may be introduced by way of probe 45 and an output voltage of harmonic frequency may be derived from the output coil 52. A high impedance input is particularly advantageous for devices of this nature since appreciable power at harmonic frequencies require that the plate current wave shape be rich in harmonics. This, however, is usually only achieved when large excitation input voltages are possible, which is precisely the condition made possible by the high impedance input circuit.

Discharge tubes of the type shown in Figs. 4 through 7 are described in greater detail and claimed in my copending application Serial No. 757,164, filed June 26, 1947. Systems and methods for producing oscillations and performing like functions in accordance with the foregoing principles are claimed in my aforesaid continuation-in-part application Serial No. 179,854.

As has been mentioned heretofore in conjunction with Fig. 1 and the remaining embodiments of the invention, the resonant circuit 6 is connected between the anode and the grid-cathode as a high frequency unit. It is preferable, however, for the connection to the grid and cathode to be made on the grid side of the high frequency substantially zero impedance interconnecting the grid and cathode. If the connection is made to the grid rather than the cathode, substantially no high frequency currents will flow through the subsatntially zero impedance or over the cathode structure. This enhances the hereinbefore described magnetic feedback phenomena and hence improves operation of the devices of the invention.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. Apparatus having controllable high input impedance for translating high frequency oscillations comprising an electrical discharge device having a cathode, a parallel wire control grid and an electrode normally maintained at a potential positive with respect to said cathode and grid, means connecting said grid to said cathode and having substantially zero impedance at the frequency of said oscillations, and an input circuit tuned to said high frequency oscillations having one point thereof connected to said electrode and another point connected to said grid and cathode as a high frequency unit and means applying biasing potential to said control grid to control the electron transit angle and thereby the input impedance of said apparatus.

2. Apparatus having controllable high input impedance for translating high frequency oscillations comprising an electrical discharge device having a cathode, a control grid and an electrode normally maintained at a potential positive with respect to said cathode and grid, means connecting said grid to said cathode and having substantially zero impedance at the frequency of said oscillations, and an input circuit tuned to said frequency having one point thereof connected to said electrode and another point connected to said grid and cathode as a high frequency unit, said last-named point of connection being on the grid side of said substantially zero impedance means and means applying biasing potential to said control grid to control the electron transit angle and thereby the input impedance of said apparatus.

3. Apparatus having controllable a high input impedance for translating high frequency oscillations comprising an electrical discharge device having a cathode, a control grid and an electrode normally maintained at a potential positive with respect to said cathode and grid, means connecting said grid to said cathode and having substantially zero impedance at the frequency of said oscillations, an input circuit tuned to said high frequency oscillations having one point thereof connected to said electrode and another point thereof connected to said cathode and grid as a high frequency unit, means for imposing on said electrode and grid energizing potentials having a value at which the phase of electric currents between said electrode and said cathode may become displaced from the phase of a corresponding high frequency voltage sufficiently to produce a substantial amount of negative resistance therein and thereby to effect a controllable high impedance in said input circuit, an output circuit connected to said device for deriving translated characteristics of said oscillations, said control grid comprising spaced substantially parallel wires to permit the flow of high frequency currents in said wires to generate a magnetic feedback for increasing the power output of said apparatus.

4. Apparatus having controllable high input impedance for translating high frequency oscillations comprising an electrical discharge device having a cathode, a control grid, an accelerator electrode, and an anode, means connecting said grid to said cathode and having substantially zero impedance at the frequency of said oscillations, an input circuit tuned to said frequency having one point thereof connected to said accelerator electrode and another point thereof connected to said cathode and grid as a high frequency unit, and an output circuit having one point thereof connected to said accelerator electrode and another point thereof connected to said anode and means applying biasing potential to said control grid to control the electron transit angle and thereby the input impedance of said apparatus.

5. Apparatus as in claim 4 in which said control grid comprises spaced substantially parallel wires.

6. Apparatus having controllable high input impedance for translating high frequency oscillations comprising an electrical discharge device having a cathode, a control grid, an accelerator electrode, and an anode, means connecting said grid to said cathode and having substantially zero impedance at the frequency of said oscillations, an input circuit tuned to said frequency having one point thereof connected to said accelerator electrode and another point thereof connected to said cathode and grid as a high frequency unit, and an output circuit connected to said device for deriving translated characteristics of said oscillations and means applying biasing potential to said control grid to control the electron transit angle and thereby the input impedance of said apparatus.

7. Apparatus as in claim 6 in which said control grid comprises spaced substantially parallel wires.

8. Apparatus having a high input impedance for translating high frequency oscillations comprising an electrical discharge device having a cathode, a control grid, an accelerator electrode, and an anode, means connecting said grid to said cathode and having substantially zero impedance at the frequency of said oscillations, an input circuit tuned to said frequency having one point thereof connected to said accelerator electrode and another point thereof connected to said cathode and grid as a high frequency unit, means for imposing on said accelerator electrode and grid energizing potentials having a value at which the phase of electric currents between said acceltrator electrode and said cathode may become displaced from the phase of a corresponding high frequency voltage in said circuit sufficiently to produce a substantial amount of negative resistance therein and thereby to effect high impedance in said input circuit, and an output circuit connected to said device for deriving translated characteristics of said oscillations.

9. An amplifier for high frequency oscillations having a high input impedance comprising an electrical discharge device having a cathode, a control grid, an accelerator electrode and an anode, means connecting said grid to said cathode and having substantially zero impedance at the frequency of said oscillations, an input circuit tuned to said frequency having one point thereof connected to said accelerator electrode and another point thereof connected to said cathode and grid as a high frequency unit, means for introducing said oscillations into said input circuit, means for imposing on said accelerator electrode and grid potentials having a valve at which the phase of electric currents between said cathode and accelerator electrode may become displaced from the phase of a corresponding high frequency voltage in said input circuit sufficiently to produce a substantial amount of negative resistance therein and thereby to effect high impedance in said input circuit, and an output circuit connected between said accelerator electrode and said anode for deriving amplified oscillations.

10. An amplifier as in claim 9 in which said control grid comprises spaced substantially parallel wires.

11. An amplifier as in claim 9 in which said potentials have values at which the electric currents between said cathode and said accelerator electrode are substantially in phase opposition to said high frequency voltage in said input circuit.

12. A converter for mixing high frequency oscillations of different frequencies having a high input impedance comprising an electrical discharge device having a cathode, an anode and a control grid, means connecting said grid to said cathode and having substantially zero impedance at the frequency of said oscillations, an input circuit tuned to said frequency having one point thereof connected to said anode and another point thereof connected to said cathode and grid as a high frequency unit, means for introducing said oscillations into said input circuit, means for imposing on said anode and grid potentials having a value at which the phase of electric currents between said anode and said cathode may become displaced from the phase of a corresponding high frequency voltage in said input circuit sufficiently to produce a substantial amount of negative resistance therein thereby to effect high impedance in said input circuit, and an output circuit connected to said device for deriving a differential frequency of said oscillations.

13. A converter as in claim 12 in which said control grid comprises spaced substantially parallel wires.

14. A converter as in claim 12 in which said potentials have values at which the electric currents between said anode and cathode are substantially in phase opposition to said high frequency voltage in said input circuit.

15. A converter for mixing a plurality of high frequency voltages of different frequencies having a high input impedance comprising an electrical discharge device having a cathode, an anode and a control grid, means connecting said grid to said cathode and having substantially zero impedance at the frequencies of said voltages, an input circuit tuned to said frequencies having one point thereof connected to said anode and another point thereof connected to said cathode and grid as a high frequency unit, means for introducing said voltages into said input circuit, means for imposing on said anode and grid potentials having a value at which the phase of electric currents between said anode and said cathode may become displaced from the phase of a corresponding high frequency voltage in said input circuit sufficiently to produce a substantial amount of negative resistance therein thereby to effect high impedance in said input circuit, and an output circuit connected to said device for deriving a voltage having a frequency which is a differential frequency of said frequencies.

16. A converter as in claim 15 in which said control grid comprises spaced substantially parallel wires.

17. A converter as in claim 15 in which said potentials have values at which the electric currents between said anode and cathode are substantially in phase opposition to said high frequency voltage in said input circuit.

18. A converter for mixing a plurality of high frequency voltages of different frequencies having a high input impedance comprising an electrical discharge device having a cathode, an anode and a control grid, means connecting said grid to said cathode and having substantially zero impedance at the frequencies of said voltages, an input circuit tuned to said frequencies having one point thereof connected to said anode and another point thereof connected to said cathode and grid as a high frequency unit, means for introducing one of said voltages into said input circuit, means for imposing on said anode and grid potentials having a value at which the phase of electric currents between said anode and said cathde may become displaced from the phase of a corresponding high frequency voltage in said input circuit sufficiently to produce a net negative resistance therein and thereby to effect self-oscillation of said converter to provide one of said voltages, and an output circuit connected to said device for deriving a voltage having a frequency which is a differential frequency of said frequencies.

19. A frequency changer for high frequency oscillations of given frequency having a high input impedance comprising an electrical discharge device having a cathode, an anode, and a control grid, means connecting said grid to said cathode and having substantially zero impedance at said frequency, an input circuit tuned to said frequency having one point thereof connected to said anode and another point thereof connected to said cathode and grid as a high frequency unit, means for introducing said oscillations into said input circuit, means for imposing on said anode and grid potentials having a value at which the phase of electric currents between said anode and said cathode may become displaced from the phase of the corresponding high frequency voltage in said input circuit sufficiently to produce a substantial amount of negative resistance therein and thereby to effect high impedance in said input circuit, and an output circuit connected to said device for deriving a voltage harmonically related to said given frequency.

20. A frequency changer as in claim 19 in which said control grid comprises spaced substantially parallel wires.

21. A frequency changer as in claim 19 in which said potentials have values at which the electric currents between said anode and said cathode are substantially in phase opposition to said high frequency voltage in said input circuit.

22. A frequency changer for high frequency oscillations of given frequency having a high input impedance comprising an electrical discharge device having a cathode, a control grid, an accelerator electrode and an anode, means connecting said grid to said cathode and having substantially zero impedance at the frequency of said oscillations, an input circuit tuned to said frequency having one point thereof connected to said accelerator electrode and another point thereof connected to said cathode and grid as a high frequency unit, means for introducing a voltage of said given frequency into said input circuit, means for imposing on said accelerator electrode and grid potentials having a value at which the phase of electric currents between said cathode and accelerator electrode may become displaced from the phase of the corresponding high frequency voltage in said input circuit sufficiently to produce a substantial amount of negative resistance therein and thereby to effect high impedance in said input circuit, and an output circuit connected between said accelerator electrode and said anode for deriving a voltage harmonically related to said given frequency.

23. A frequency changer as in claim 22 in which said control grid comprises spaced substantially parallel wires.

24. A frequency changer as in claim 22 in which said potentials have values at which the electric currents between said cathode and said accelerator electrode are substantially in phase opposition to said high frequency voltage in said input circuit.

(References on following page)

References Cited in the file of this patent

UNITED STATES PATENTS

| | | |
|---|---|---|
| Re. 23,369 | Llewellyn | May 22, 1951 |
| 2,153,728 | Southforth | Apr. 11, 1939 |
| 2,429,811 | Guarrera | Oct. 28, 1947 |
| 2,440,089 | Haeff | Apr. 20, 1948 |
| 2,451,249 | Smith | Oct. 12, 1948 |
| 2,485,400 | McArthur | Oct. 18, 1949 |
| 2,547,372 | Burnside | Apr. 3, 1951 |
| 2,577,454 | Diemer | Dec. 4, 1951 |
| 2,591,316 | Strutt | Apr. 1, 1952 |
| 2,619,597 | Mlynczak | Nov. 25, 1952 |